United States Patent
Connell, II et al.

(10) Patent No.: US 9,514,354 B2
(45) Date of Patent: Dec. 6, 2016

(54) FACIAL ANALYSIS BY SYNTHESIS AND BIOMETRIC MATCHING

(71) Applicant: International Business Machines Corporation, Armonk, NY (US)

(72) Inventors: Jonathan H. Connell, II, Cortlandt-Manor, NY (US); Sharathchandra U. Pankanti, Darien, CT (US); Nalini K. Ratha, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 14/561,863

(22) Filed: Dec. 5, 2014

(65) Prior Publication Data
US 2015/0169945 A1  Jun. 18, 2015

Related U.S. Application Data (60) Provisional application No. 61/917,376, filed on Dec. 18, 2013.

(51) Int. Cl.
*G06K 9/46* (2006.01)
*G06K 9/00* (2006.01)
(Continued)

(52) U.S. Cl.
CPC ........... *G06K 9/00248* (2013.01); *G06K 9/033* (2013.01); *G06K 9/6203* (2013.01)

(58) Field of Classification Search
CPC .. G06K 9/00248; G06K 9/083; G06K 9/6203; G06K 9/00228; G06K 9/00221; G06K 9/00288; G06K 9/00281; G06K 9/033
(Continued)

(56) References Cited

U.S. PATENT DOCUMENTS 5,844,573 A * 12/1998 Poggio .................... G06T 11/00
                                                  345/441
6,888,955 B2 * 5/2005 Masumoto ......... G06K 9/00281
                                                  382/118
(Continued)

OTHER PUBLICATIONS

Wang et al. "Appearance-based Color Face Recognition With 3D Model", International Conference on Graphic and Image Processing (ICGIP 2012), edited by Zeng Zhu, Proc. of SPIE vol. 8768, 87680J, © 2013 SPIE, CCC code: 0277-786X/13, doi: 10.1117/12.2003304.

*Primary Examiner* — Sheela C Chawan
(74) *Attorney, Agent, or Firm* — Isaac J. Gooshaw (57) ABSTRACT

One or more processors generate a set of facial appearance parameters that are derived from a first facial image. One or more processors generate a graphics control vector based, at least in part, on the set of facial appearance parameters. One or more processors render a second facial image based on the graphics control vector. One or more processors compare the second facial image to the first image. One or more processors generate an adjusted vector by adjusting one or more parameters of the graphics control vector such that a degree of similarity between the second facial image and the first facial image is increased. The adjusted vector includes a biometric portion. One or more processors generate a first face representation based, at least in part, on the biometric portion of the adjusted vector.

20 Claims, 5 Drawing Sheets

(51) Int. Cl.
 *G06K 9/03* (2006.01)
 *G06K 9/62* (2006.01)
(58) Field of Classification Search
 USPC ............... 382/100, 118, 115, 155, 156, 190,
  181,382/232, 248, 250, 291, 276, 286,
  224; 345/156, 418, 419; 706/15, 16, 20
 See application file for complete search history.

(56) References Cited

U.S. PATENT DOCUMENTS

| | | | |
|---|---|---|---|
| 7,095,878 B1 * | 8/2006 | Taylor | G06K 9/00275 |
| | | | 382/118 |
| 7,672,482 B2 * | 3/2010 | Bolin | G06K 9/00281 |
| | | | 382/103 |
| 7,755,619 B2 * | 7/2010 | Wang | G06T 7/0065 |
| | | | 345/419 |
| 7,953,278 B2 | 5/2011 | Sung | |
| 8,194,938 B2 | 6/2012 | Wechsler et al. | |
| 8,477,147 B2 | 7/2013 | Livingston et al. | |
| 8,503,739 B2 * | 8/2013 | Bourdev | G06K 9/00281 |
| | | | 382/118 |
| 8,803,975 B2 * | 8/2014 | Haupt | G06K 9/00288 |
| | | | 348/161 |
| 2006/0120571 A1 | 6/2006 | Tu et al. | |
| 2007/0172099 A1 | 7/2007 | Park et al. | |
| 2012/0213422 A1 | 8/2012 | Niskanen et al. | |
| 2013/0121584 A1 | 5/2013 | Bourdev et al. | |
| 2013/0195316 A1 | 8/2013 | Bataller et al. | |
| 2013/0259324 A1 | 10/2013 | Huang et al. | |

\* cited by examiner

FACIAL ANALYSIS BY SYNTHESIS AND BIOMETRIC MATCHING

BACKGROUND OF THE INVENTION

The present invention relates generally to the field of facial recognition, and more particularly to analysis by iterative synthesis.

A facial recognition system is a computer application for automatically identifying or verifying a person from a digital image or a video frame from a video source. One of the ways to do this is by comparing selected facial features from the image and a facial database. Such systems are typically used in security systems and can be compared to other biometric identification methods, such as fingerprint or eye iris recognition systems.

Some facial recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the compressed face data. One of the earliest successful systems was based on template matching techniques using principle component analysis of grayscale images, providing a type of compressed face representation. Recognition algorithms can be divided into two main approaches: geometric, which looks at discrete distinguishing features; and photometric, which is a statistical approach that extracts holistic descriptors from an image.

While there are known solutions for facial recognition and matching, there are often challenges that are associated with each of them. For example, 2D approaches are often confounded by changes in lighting or head orientation. In addition, they often do not work with low resolution images and cannot fuse information across multiple frames to improve themselves. While 3D approaches can better disentangle the effect of environment and true biometrics, and some can fuse information from multiple images, the approaches are unitary and cannot exploit additional information sources which may have been developed independently. Finally, most approaches perform identification by scoring all sample images in a gallery against the query face, which can take an inordinately long time as the database grows large.

SUMMARY

Embodiments of the present invention provide a method, system, and program product for recognizing a face in an image. One or more processors generate a set of facial appearance parameters that are derived from a first facial image. One or more processors generate a graphics control vector based, at least in part, on a set of facial appearance parameters. One or more processors render a second facial image based on the graphics control vector. One or more processors compare the second facial image to the first facial image. One or more processors generate an adjusted vector by adjusting one or more parameters of the graphics control vector such that a degree of similarity between the second facial image and the first facial image is increased, wherein the adjusted vector includes a biometric portion. One or more processors generate a first face representation based, at least in part, on the biometric portion of the adjusted vector.

DETAILED DESCRIPTION

Embodiments of the present invention provide application of gradient descent using a local inverse model of a face rendering engine/system. One embodiment provides a variety of facial appearance estimators, which are used to initially bias the search into the correct portion of the image space. One embodiment provides separating the graphics control vector into environmental (i.e., non-biometric) and biometrics components. Such separation allows some embodiments to remove certain influences more cleanly (i.e., they are not mixed together in the pixels). One embodiment provides a subset of the resulting optimized graphics control vector elements, which is used as a facial representation vector. One embodiment provides fusion of information from multiple images or video frames into the graphics vector to build a more complete representation. While attributes like pose or expression may vary between images, core attributes such as skull shape remain the same. Thus, in some embodiments, different views of the same face are used to fill in the geometry of different portions of the head. One embodiment provides sub-linear matching time to a large gallery of identities. As such, in one embodiment, the comparison of face representation vectors is accomplished directly in logarithmic time, as opposed to testing the probe image separately against every gallery record in the matching database, thus providing a decrease in response time and storage bandwidth (because not all the images have to be retrieved for comparison).

The present invention will now be described in detail with reference to the Figures.

Figure 1:
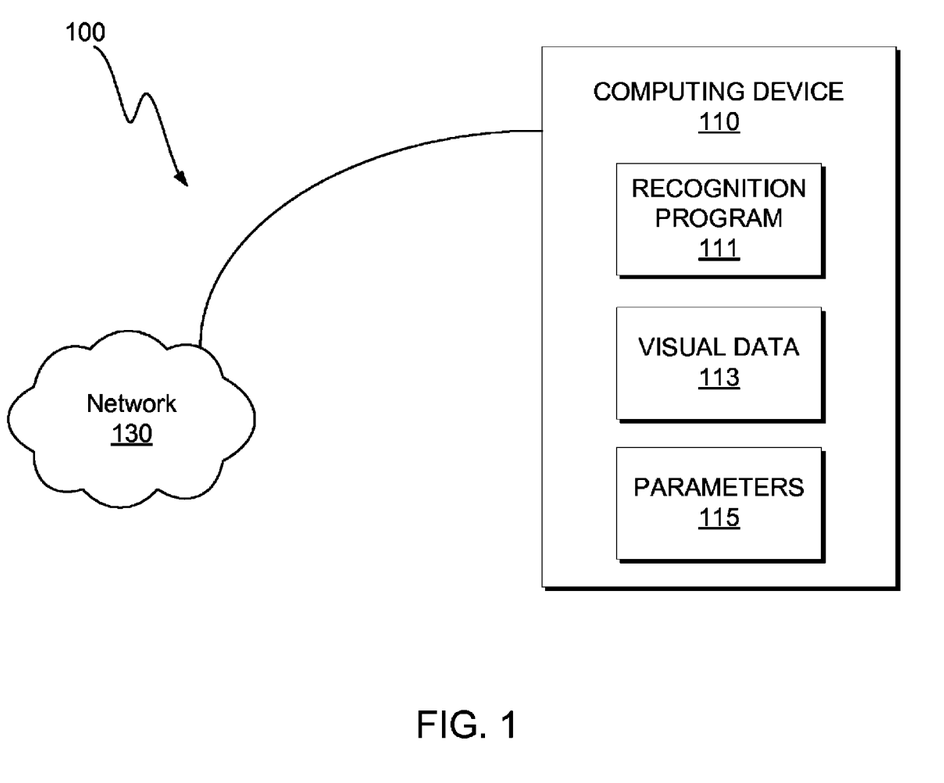
FIG. 1 is a functional block diagram illustrating an image analysis environment, in accordance with an exemplary embodiment of the present invention.

FIG. 1 is a functional block diagram illustrating an image analysis environment, generally designated 100, in accordance with one embodiment of the present invention. Image analysis environment 100 includes computing device 110, which is optionally connected to network 130 (which is not present in all embodiments). Computing device 110 includes recognition program 111, visual data 113, and parameters 115. Note that in some embodiments, computing device 110 is connected to an external device, such as a camera, for live facial input.

In various embodiments of the present invention, computing device 110 is a computing device that can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to recognition program 111, visual data 113, and parameters 115, and is capable of executing recognition program 111. Computing device 110 may include internal and external hardware components, as depicted and described in further detail with respect to FIG. 6.

In this exemplary embodiment, recognition program 111, visual data 113, and parameters 115 are stored on computing device 110. However, in other embodiments, recognition program 111, visual data 113, and parameters 115 may be stored externally and accessed through a local connection (not shown) or through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110, recognition program 111, visual data 113, and parameters 115, in accordance with a desired embodiment of the present invention.

Recognition program 111, is, in general, a face recognition program. Recognition program 111 accesses visual data included in visual data 113, such as video footage and pictures, and performs facial analysis on that visual data. In one embodiment, to perform the facial analysis, recognition program 111 accesses parameters 115 and extracts facial features as well as environmental conditions that are associated with one or more pieces of visual data that have been or are currently being analyzed by recognition program 111.

Parameters 115 include information such as parameters for environmental information, facial features, and orientation details that are associated with visual data included in visual data 113. For example, parameters 115 include data extracted from an analysis of photograph "A". The data may indicate that there is a light source to the right of and behind an individual in the photograph. The data may also indicate how the face is oriented, for example, that the face is aimed up and to the left relative to the image acquisition device. The data may also include the location boxes for facial features such as, for example, the eyes, ears, nose, and mouth of the individual. Recognition program 111 uses such information for recognition and to render other images based on the original image, as explained in further detail below.

Figure 2:
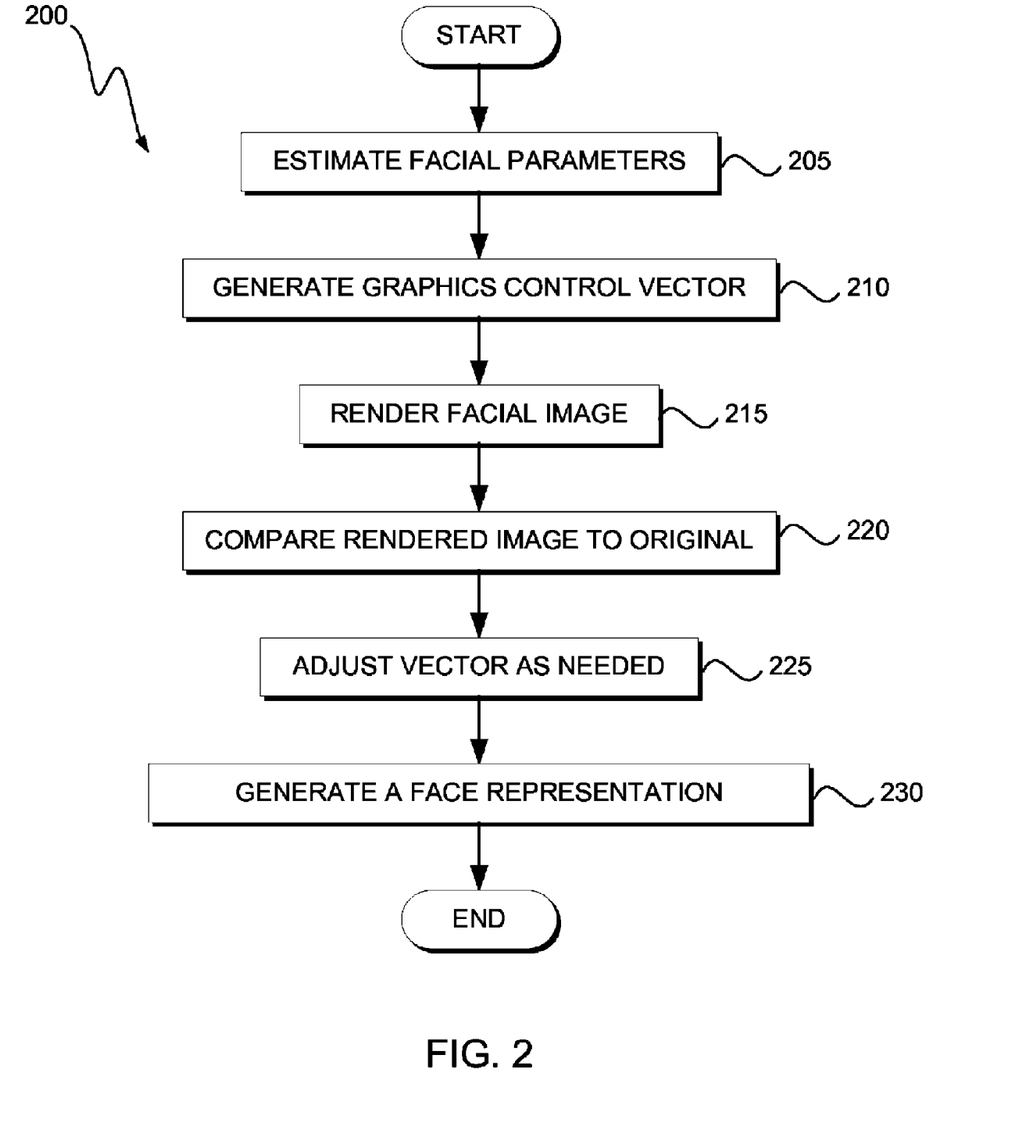
FIG. 2 illustrates operational processes of a recognition program, on a computing device within the environment of FIG. 1, in accordance with an exemplary embodiment of the present invention.

FIG. 2 illustrates a flow diagram, 200, depicting the operational processes of recognition program 111, on a computing device within the environment of FIG. 1, in accordance with an exemplary embodiment of the present invention.

In exemplary embodiments, recognition program 111 builds a biometric representation of a person's face from one or more still images or video frames using data included as part of visual data 113. The basic process flow of one embodiment of recognition program 111 is illustrated in FIG. 2. In FIG. 2, recognition program 111 determines a plurality of facial parameters (both extrinsic and intrinsic, which are defined in the discussion of FIG. 3) from an original image in step 205, and saves them as part of parameters 115. In some embodiments, recognition program 111 determines a plurality of facial parameters (both extrinsic and intrinsic) from an original image using a process of estimation to determine the plurality of facial parameters. In one embodiment, such facial parameters (both extrinsic and intrinsic) comprise at least two of: an estimated age of the individual, gender, facial shape, tissue depth, gaze direction, head orientation, facial expression, ambient lighting that causes illumination and/or shadowing of the face, ornamentation (such as jewelry, clothing and sunglasses), and demographic parameters as understood by one skilled in the Art. One embodiment allows the incorporation of partial scene estimators. For example, in one embodiment, a non-face-specific illumination direction inference routine is combined with an object-recognition-based sunglass detector thereby allowing recognition program 111 to infer a biometric representation, even though neither piece of information is directly related to biometrics.

Recognition program 111 accesses visual data included in visual data 113. Recognition program 111 analyzes the retrieved visual data and generates analysis results including parameters. Then, recognition program 111 stores at least some of the parameters (which are included as part of the analysis results) as part of parameters 115. Recognition program 111 generates a graphics control vector by combining those parameters in step 210. Recognition program 111 renders a facial image from the graphics control vector and saves that image as part of visual data 113, in step 215. Recognition program 111 compares the rendered image with the original image in step 220. In step 225, recognition program 111 makes adjustments to the vector, if any are needed, based on results of the comparison. For example, recognition program 111 determines whether adjustments need to be made to the vector based, at least in part, on whether a result of the comparison exceeds a threshold. In some embodiments, the result of such a comparison is represented as one or more of a number, a percentage, differences in a set of vector components, or a percentage of difference in image features, etc. In general, the thresholds have units of measure that correspond to that of the result (e.g., number, percentage, etc.), which facilitates comparison between them. For example, the result is a percentage. As such, in this example, the threshold is a value in the form a percentage (e.g., 72%) to which the result (e.g., 74%) may be compared. As such, recognition program 111 determines whether the result exceeds the threshold and, based on that determination, recognition program 111 determines whether adjustments need to be made to the vector.

In some embodiments and situations, an adjusted image is rendered, by recognition program 111, based on an adjusted vector. In one embodiment, recognition program 111 compares the adjusted image to the original image and the adjusting/rendering steps (steps 210-225) are repeated until the images converge. In one embodiment, once recognition program 111 obtains the adjusted vector, recognition program 111 extracts the shape portion of the adjusted vector and uses it to generate a face representation (which is stored as part of visual data 113) in step 230. In some embodiments, the face representation is in the form of a vector. Recognition program 111 compares the generated face representation to one or more stored face representations (representing known subjects) for facial recognition. In some embodiments, recognition program 111 generates one or more matching scores, which are then included as part of parameters 115. In some embodiments, recognition program 111 ranks such scores to obtain a list of most likely subjects (i.e., persons correlated to the face in the original image) for presentation to a user.

Figure 3:
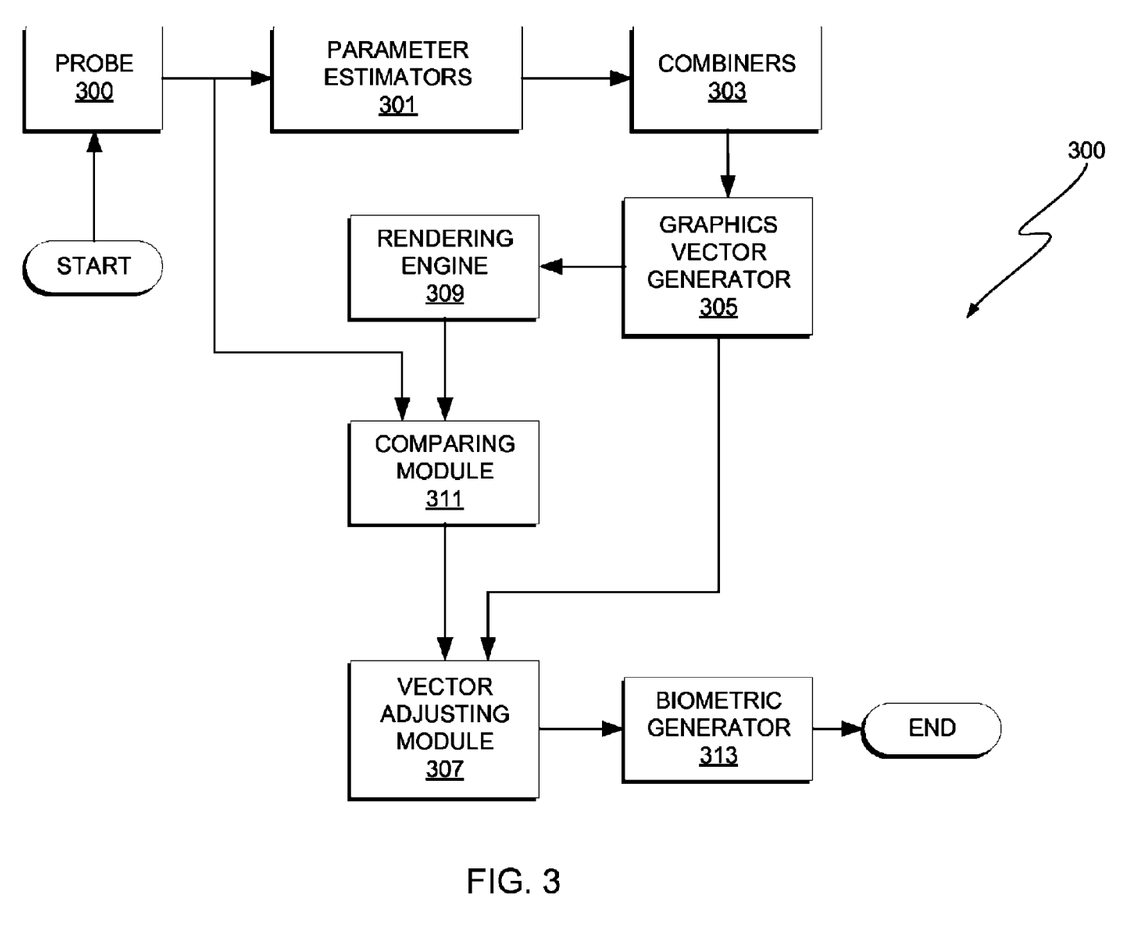
FIG. 3 illustrates a functional block diagram that shows the connectivity between various program modules included in the recognition program of FIG. 2, as well as a general workflow employed by that recognition program, in accordance with an exemplary embodiment of the present invention.

FIG. 3 illustrates a functional block diagram, 300, that shows the connectivity between various program modules included in recognition program 111, as well as a general workflow employed by recognition program 111, in accordance with an exemplary embodiment of the present invention.

Referring now to FIG. 3, as a preliminary step, recognition program 111 detects and marks the locations of potential faces in the image(s) 300 (denoted "probe" in FIG. 3) for further analysis. A number of independent facial appearance analysis routines (collectively illustrated as "parameter estimators" 301 in FIG. 3) may be applied to the image(s). For parameter estimation, there are two classes of parameters to be estimated (i.e., there are two classes of parameters included as part of parameters 115). The first are intrinsic parameters of the face. These include demographic properties, such as membership in a broad class of individuals, which may influence facial appearance. These demographic properties may be inferred indirectly from separate measurements such as height. For example, an individual taller than 4 feet is likely an adult human rather than a child. As such, in this example, adult faces are expected to be larger, thinner, and have more skin wrinkles than the face of a child. In this example, an adult human is a first demographic and a child is a second demographic. Intrinsic properties may also include shape parameters such as the geometry of the skull and tissue depths at various points on the face. They may also include "fluents" (properties that change over time) such as gaze direction and facial expression. The second class of parameters to estimate include extrinsic parameters, which govern image formation. These include environmental factors such as the pose of the person's head and the ambient lighting. There are also various "ornamentations" (proximal environmental factors) that can be detected such as glasses, hats, hairstyles, jewelry, and facial hair patterns.

Figure 4:
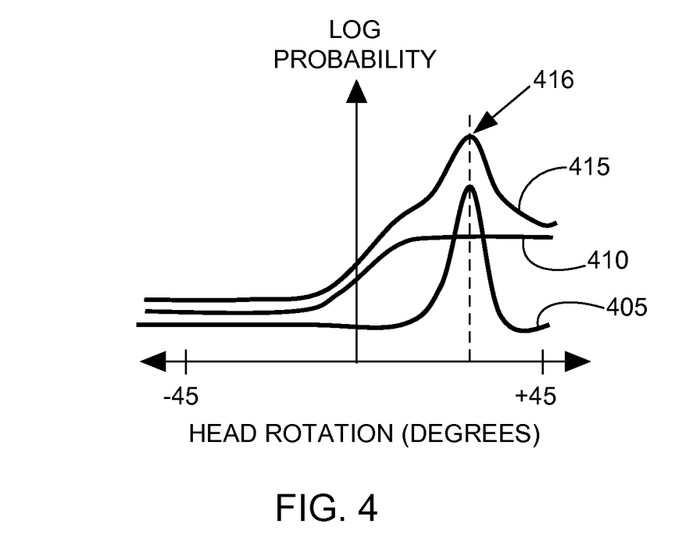
FIG. 4 illustrates a graphical representation of conflict resolution between one or more estimators, in accordance with an exemplary embodiment of the present invention.

In FIG. 3, once initial parameter estimates have been made for some of these parameters, a vector of graphics control values is generated by combining the parameter estimates using various combiners, e.g., combiners 303 of FIG. 3. Note that, in some embodiments and scenarios, various estimators will disagree on a property, such as head orientation. In such cases, recognition program 111 applies a conflict resolution strategy. Examples of such strategies include generating confidence scores for estimates and taking the estimate with the highest confidence score, or using a weighted mixture of the estimates. Another example of conflict resolution strategy is for recognition program 111 to have the estimators vote with probability density functions (pdf's), or logarithmic pdf's. FIG. 4 illustrates a graphical representation of conflict resolution between two estimators, in accordance with an exemplary embodiment of the present invention.

FIG. 4 illustrates the degree of head rotation as determined by estimator 1 (represented by line 405) and estimator 2 (represented by line 410). The graph shown in FIG. 4 has a y-axis showing the log probability of the head being at a particular degree of rotation. The degree of rotation is shown on the x-axis. As seen, 405 and 410 do not agree. Therefore, recognition program 111 resolves this conflict by combining the respective degrees of head rotation (405 and 410) and generates a combined degree of head rotation (represented by line 415), which includes the most likely degree of head rotation (416). Thus, in such embodiments and scenarios, the estimators express a preference for a property that is disagreed upon. For example, the estimators express a preference for a head rotation of 30 degrees and lesser preferences for angles of 27 and 33 degrees. The selected parameter value for rotation would then be the maximum likelihood obtained after multiplying all the pdf's together (or, equivalently, adding the log pdf's).

Figure 5:
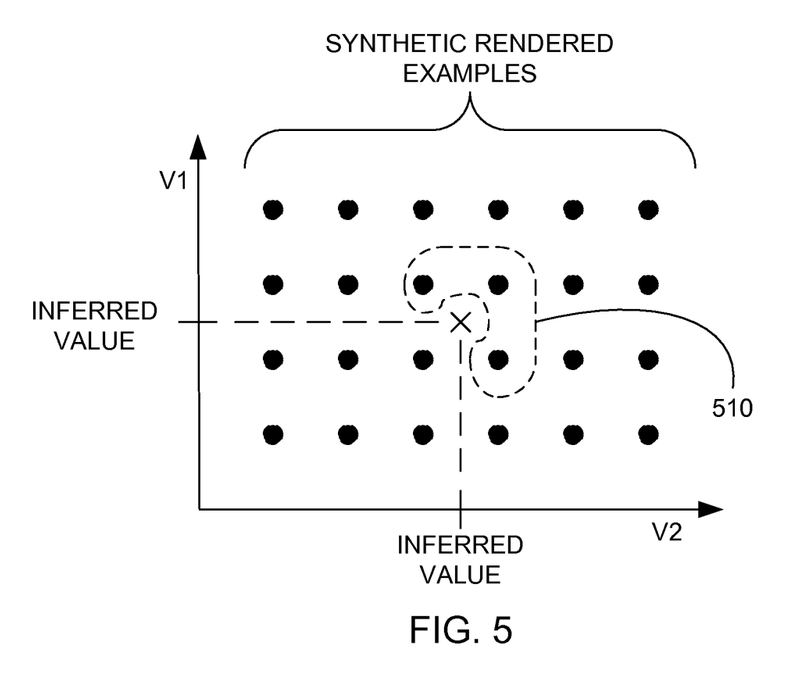
FIG. 5 illustrates a graph depicting an inference of a parameter value based on the three most likely matches for the probe image, in accordance with an exemplary embodiment of the present invention.

Referring now to FIG. 5, in some embodiments, while some estimators only express a preference about a small set of parameters, others affect larger sets. For example, one of the estimators is a complete 2D facial recognition system which matches against a database of mug shots. For example, in FIG. 5, such an estimator determines the three most likely matches (included in dashed region 510) for the probe image. If the database also contains the full graphics vectors associated with these matches, then the vectors are combined (e.g. by averaging) to form an interpolated estimate (shown as an "X", where the inferred values of V1 and V2 meet in FIG. 5) for the refinement process described below. Alternatively, the parameters in the graphics vectors from each of the three hits (along with parameters from the other estimators) are processed separately, in sequence, by the refinement engine. The reconstruction results are compared later (e.g. in terms of residual pixel error) to choose the best version of the graphics control vector.

Referring again to FIG. 3, in some embodiments, a probability that the separate images show the same individual is determined. This probability may be based, for example, on a comparison of facial characteristics of the individual(s) present in both images. For example, a comparison of a face in a first image to a face in a second image indicates that there is a 95% match between the shape and size of a skull, nose, eye and mouth of the paired faces. If recognition program 111 determines that two or more separate images have a high enough probability (above a threshold) that the separate images show the same individual, then recognition program 111 combines the parameter sets from those matched images. In such embodiments and scenarios, recognition program 111 combines biometric parameters, such as skull shape and tissue depths, from multiple matched images, using combiners 303.

In some embodiments, recognition program 111 separately optimizes other parameters, such as pose and lighting, for the different images in a given collection of images of the same individual to facilitate the combination of biometric parameters from multiple images. In some embodiments, recognition program 111 uses non-visual metadata in this combination process. For example, a person's face changes in characteristic ways over time. Suppose a photograph of an individual is known to have been taken on a specific date, in this example 1967. Another photograph of the same individual was taken in 1975. If the individual in question was born in 1913, a morpho-metric age adjustment process may be used to transform the 1967 image of a 54 year old into an expected 1975 image of a 62 year old. This facilitates building a coherent model of the individual as he would appear in 1975. The dates of the photographs and the individual's birthdate are non-visual metadata. A similar, but only approximate, transformation may also be performed without non-visual metadata. For example, a visual classifier may determine that an individual is in his 50's in one image and in his 60's in another image. The same age adjustment process could then be applied to the first image to make it more compatible for combination with the second image.

In some embodiments, recognition program 111 modifies parameter sets from a series of contiguous video frames. In such embodiments and scenarios, recognition program 111 establishes a continuity of identity (that the image is of the same person) using spatio-temporal tracking. In some embodiments, certain parameters are combined together, by recognition program 111 using combiners 303, for all frames. In some embodiments and scenarios, some parameters are identified that are known to vary slowly and smoothly while other parameters are identified as those that do not vary at all. For instance, the length of an adult person's nose is constant over time, i.e., not variable, whereas other parameters like head roll angle vary smoothly, and others like mouth opening are often unchanging for long stretches. In some embodiments, recognition program 111 uses the rate of change of a parameter to infer more accurate biometric parameters for a person, which are, in part, dependent on the length of the video sequence. In one example, a video sequence of a face includes relatively constant parameters, such as for the nose, versus varying parameters, such as head roll and mouth.

Recognition program 111 uses the combined parameters to generate a set of control values and assembles them into a graphics vector using graphics vector generator 305 (also called a graphics control vector generator). Recognition program 111 inputs this graphics vector (generated by graphics vector generator 305) into a photorealistic face rendering engine (denoted rendering engine 309 in FIG. 3) to generate a synthetic facial image with similar properties to the original image. Recognition program 111 uses comparing module 311 to compare rendered images with the original image (received from probe 300), in accordance with an embodiment.

In general, recognition program 111 generates a set of graphics control parameters that is expected (i.e., is statistically likely) to achieve a degree of success in recreating the actual image observed. As noted before, such a set of parameters includes both biometric (e.g. skull shape) and non-biometric information (e.g. lighting angle). In one embodiment, for the purpose of representing individuals, recognition program 111 retains only the biometric elements of the vector. In an embodiment, the biometric representation, generated by biometric generator 313, comprises information on skull geometry, tissue depths, and surface albedos. In other embodiments, recognition program 111 also retains additional non-geometric demographic information, such as age, which is understood by those skilled in the art.

Recognition program 111 further inputs the graphics vector (received from graphics vector generator 305) into vector adjusting module 307, which modifies the graphics control parameters to cause the rendered image to better match the original image. In one embodiment, this adjustment is performed by generating a local forward model of rendering engine 309 by building a Jacobian image matrix using equation 1 (shown below in table 1). The forward model shows what happens to the various pixels in the output image when each of the input graphics control parameters is varied by a given degree (here "$f_n$" is the intensity of an image pixel and "$x_n$" is a graphics control parameter).

TABLE 1

Equation 1

$$J(f, x) = \frac{df}{dx} = \begin{bmatrix} \frac{\partial f_1}{\partial x_1} & \frac{\partial f_1}{\partial x_2} & \cdots & \frac{\partial f_1}{\partial x_N} \\ \frac{\partial f_2}{\partial x_1} & \frac{\partial f_2}{\partial x_2} & \cdots & \cdots \\ \cdots & \cdots & \cdots & \cdots \\ \frac{\partial f_M}{\partial x_1} & \cdots & \cdots & \frac{\partial f_M}{\partial x_N} \end{bmatrix}$$

For example, if the vertical length of a nose is increased ten percent, then pixels which formerly mapped to the upper lip will become darker because of the increased shadow under the longer nose. If the rendered image is "m" by "n" pixels and there are "k" control parameters, the Jacobian will be a k by m*n matrix. The elements of the matrix are obtained by repeated rendering with slightly different parameter values. To accurately determine the differences, the rendered image must be properly aligned with the original image.

The forward model is then inverted to suggest, based on pixel errors, how to adjust the graphics parameters. In some embodiments and scenarios, the exact inverse of the Jacobian cannot be computed. In such cases recognition program 111 forms an approximate inverse for the Jacobian. In one embodiment, recognition program 111 forms such an approximation by taking the pseudo-inverse, or in some cases just the transpose, of the matrix. Using the pixel-wise differences of the "best-guess" rendered image and the input image computed by comparing module 311, recognition program 111 passes the difference values through the inverse Jacobian to generate a set of suggested alterations to the graphics control parameters. Generally, recognition program 111 does not take the full adjustment step suggested for each parameter, but rather recognition program 111 applies some fraction of the full adjustment. In one embodiment, such a fraction is, for example, a fixed percentage, or is a fraction that is adjusted downward over successive iterations, as in simulated annealing.

In some embodiments, recognition program 111 uses the new set of graphics control values to render a slightly different face, and the whole cycle of generating an image, comparing the generated image to the original image, and generating a set of suggested alterations to the graphics control parameters repeats. The iteration terminates when recognition program 111 determines that sufficiently little progress is being made toward reducing the residual pixel error, or recognition program 111 determines that it is cycling. In this embodiment, such determinations are dependent on one or more thresholds, which are configured for and are used by recognition program 111, to govern such iteration activity.

In an embodiment, recognition program 111 generates a fixed-length vector for the person, based on the final set of graphics control values, and compares it to other similar vectors. For example, recognition program 111 compares the generated fixed-length vector to vectors stored in an indexed database, without the need for image reconstruction. In one embodiment, recognition program 111 uses R-trees to make such comparisons. In R-trees, an approximate nearest neighbor search is performed in O(log n) time, where n is the number of records to be searched against. Another advantage of R-trees is that R-trees have efficient insertion and deletion procedures (unlike, for instance, support vector machine (SVM) classifiers). In practice, R-trees may be useful if the database is likely to be undergoing continuous change.

In some embodiments, recognition program 111 allows users to more directly interact with the optimization process by altering graphics control parameters. In essence, the human user is performing their own comparison (similar to comparison module 311) and correcting one or more of the graphics control parameters (similar to vector adjusting module 307). For instance, if one of the skull geometry properties being estimated was the center of the eye sockets, recognition program 111 overlays the currently inferred centers on the input image and allows a user to drag them into a new, and perhaps more accurate, location and/or orientation. Similarly, if recognition program 111 estimates head pose, recognition program 111 displays an arrow indicating head direction and allows a user to "grab" (for example using a mouse interaction) the end of this arrow to help adjust the head pose.

In one embodiment, recognition program 111 handles certain parameters through the use of caricatures, such as a schematic showing a full frontal face and the inferred mouth opening (one of the possible graphics control parameters). In such embodiments and scenarios, recognition program 111 allows a user to interact with the caricature/diagram. For example, the user interacts with the caricature (generated by recognition program 111) to change the caricature from an open mouth conformation to a pursed lips conformation.

In some embodiments, recognition program 111 allows a user to select and/or de-select items, such as ornamentations, from a list. In such embodiments and scenarios, recognition program 111 provides the user the ability to correct errors made by recognition program 111. For example, in a situation when recognition program 111 has mistaken a deep neck shadow for a dark beard in a low resolution image, the user may identify the error and de-select "beard" from a list of possible ornamentations for the image. In some embodiments and scenarios, since the core refinement cycle is gradient descent, and the optimization score space is known to be bumpy, such interactions help bias recognition program 111 toward the correct local minimum (much as the pre-optimization feature estimators do). In some embodiments and scenarios, recognition program 111 allows the user to lock certain parameters, such as the presence of "bushy" eyebrows, to prevent the system from altering or removing them during the optimization process.

In some embodiments, recognition program 111 uses partial matching results to help refine the parameter estimation process. For example, recognition program 111 retrieves the top one hundred matches from the database and uses a consensus voting scheme to determine whether the subject belongs to a group in which members share certain characteristics. For example, when a large majority of matches belong to a given group, recognition program 111 may determine that there is a high probability that the subject also belongs to that group. By a consensus voting scheme, it might be possible to tell that the subject definitely has a beard since the large majority of matches are marked as being having beards. At this point, it may even be advantageous to re-run some of the initial estimators. For instance, typical beard patterns may be different from one group to another. By restricting the estimator to a more likely set of candidate patterns (or adjusting the prior probabilities) the rate of false positives can be reduced.

In some embodiments, recognition program 111 utilizes human perception in an incremental way. For example, recognition program 111 renders the top twenty biometric matches, but does so using the same currently estimated non-biometric parameters (e.g. pose, lighting, facial hair, glasses) as those determined for the input image. Recognition program 111 prompts a user to select on the image(s) that they perceive as most similar to the input image. Alternatively, recognition program 111 uses a conventional 2D face recognition image to score these matches. In either case, recognition program 111 uses a robust weighted estimate of the intrinsic (biometric) properties from these matches to identify a better region of the parameter space for gradient descent.

Figure 6:
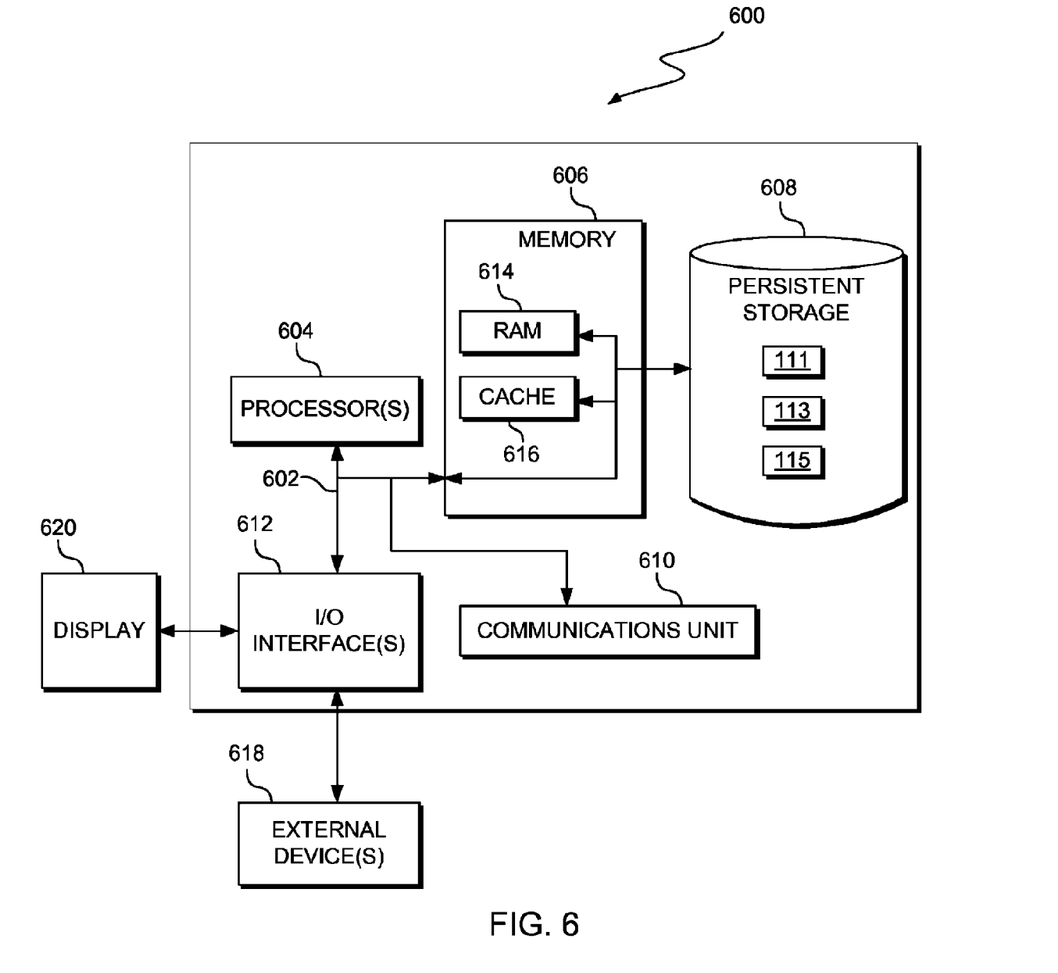
FIG. 6 depicts a block diagram of components of the computing device executing the recognition program of FIG. 2, in accordance with an exemplary embodiment of the present invention.

FIG. 6 depicts a block diagram, 600, of components of computing device 110, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 110 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Recognition program 111, visual data 113, and parameters 115 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 130. In these examples, communications unit 610 includes one or more network interface cards. Communications unit 610 may provide communications through the use of either or both physical and wireless communications links. Recognition program 111, visual data 113, and parameters 115 may be downloaded to persistent storage 608 through communications unit 610.

I/O interface(s) 612 allows for input and output of data with other devices that may be connected to computing device 110. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., recognition program 111, visual data 113, and parameters 115, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that some term(s) may be subject to trademark rights in various jurisdictions throughout the world and are used here only in reference to the products or services properly denominated by the marks to the extent that such trademark rights may exist.

What is claimed is:

1. A method for recognizing a face in a first facial image, the method comprising:
    generating, by one or more processors, a set of facial appearance parameters that are derived from a first facial image;
    generating, by one or more processors, a graphics control vector based, at least in part, on the set of facial appearance parameters;
    generating, by one or more processors, a local inverse model of a graphics rendering process by building an image Jacobian matrix with respect to elements of the graphics control vector, the local inverse model being used to generate the adjusted vector;
    rendering, by one or more processors, a second facial image based on the graphics control vector;
    comparing, by one or more processors, the second facial image to the first facial image;
    generating, by one or more processors, an adjusted vector by adjusting one or more parameters of the graphics control vector such that a degree of similarity between the second facial image and the first facial image is increased, wherein the adjusted vector includes a biometric portion; and
    generating, by one or more processors, a first face representation based, at least in part, on the biometric portion of the adjusted vector.

2. The method of claim 1, the method further comprising:
    iteratively repeating, by one or more processors, a process comprising:
        rendering, by one or more processors, a third facial image that is generated using an updated version of the adjusted vector; and
        comparing, by one or more processors, the third facial image to the first facial image, wherein one or more parameters of the adjusted vector are updated until a degree of difference between the first facial image and the third facial image is below a threshold at which point repetition ends.

3. The method of claim 1, the method further comprising:
    performing, by one or more processors, facial recognition based, at least in part, on the first face representation, wherein the first face representation is compared to at least one second face representation.

4. The method of claim 3, the method further comprising:
    generating, by one or more processors, a fixed-length vector as the first face representation by extracting the biometric portion of the adjusted vector; and
    comparing the first face representation fixed-length vector to the at least one second face representation fixed-length vector using an approximate nearest neighbor match.

5. The method of claim 1, wherein facial appearance parameters include both of extrinsic features and biometric features.

6. The method of claim 1, wherein generating, by one or more processors, the set of facial appearance parameters that are derived from a first facial image comprises:
    determining, by one or more processors, a plurality of estimates for one or more facial appearance parameters of the first facial image;
    utilizing, by one or more processors, at least one conflict resolution approach when two or more estimates of the plurality of estimates are determined for a given facial appearance parameter of the first facial image; and
    generating, by one or more processors, the set of facial appearance parameters based, at least in part, on a facial appearance parameter that was determined, in part, using the at least one conflict resolution approach.

7. The method of claim 1, wherein generating an adjusted vector comprises:
    presenting, by one or more processors, one or more graphics control vector values to a user; and
    receiving, by one or more processors, an update, from the user, to at least one of the one or more graphics control vector values.

8. A computer program product for recognizing a face in a first facial image, the computer program product comprising:
    one or more computer-readable storage media and program instructions stored on the one or more computer-readable storage media, the program instructions comprising:
        program instructions to generate a set of facial appearance parameters that are derived from a first facial image;
        program instructions to generate a graphics control vector based, at least in part, on the set of facial appearance parameters;
        program instructions to generate a local inverse model of a graphics rendering process by building an image Jacobian matrix with respect to elements of the graphics control vector, the local inverse model being used to generate the adjusted vector;
        program instructions to render a second facial image based on the graphics control vector;
        program instructions to compare the second facial image to the first facial image;
        program instructions to generate an adjusted vector by adjusting one or more parameters of the graphics control vector such that a degree of similarity between the second facial image and the first facial image is increased, wherein the adjusted vector includes a biometric portion; and
        program instructions to generate a first face representation based, at least in part, on the biometric portion of the adjusted vector.

9. The computer program product of claim 8, the program instructions further comprising:
    program instructions to iteratively repeat a process comprising:
        rendering, by one or more processors, a third facial image that is generated using an updated version of the adjusted vector; and comparing, by one or more processors, the third facial image to the first facial image, wherein one or more parameters of the adjusted vector are updated until a degree of difference between the first facial image and the third facial image is below a threshold at which point repetition ends.

10. The computer program product of claim 8, the program instructions further comprising:
program instructions to perform facial recognition based, at least in part, on the first face representation, wherein the first face representation is compared to at least one second face representation.

11. The computer program product of claim 10, the program instructions further comprising:
program instructions to generate a fixed-length vector as the first face representation by extracting the biometric portion of the adjusted vector; and
comparing the first face representation fixed-length vector to the at least one second face representation fixed-length vector using an approximate nearest neighbor match.

12. The computer program product of claim 8, wherein facial appearance parameters include both of extrinsic features and biometric features.

13. The computer program product of claim 8, wherein program instructions to generate the set of facial appearance parameters that are derived from a first facial image comprise:
program instructions to determine a plurality of estimates for one or more facial appearance parameters of the first facial image;
program instructions to utilize at least one conflict resolution approach when two or more estimates of the plurality of estimates are determined for a given facial appearance parameter of the first facial image; and
program instructions to generate the set of facial appearance parameters based, at least in part, on a facial appearance parameter that was determined, in part, using the at least one conflict resolution approach.

14. The computer program product of claim 8, wherein generating an adjusted vector comprises:
program instructions to present one or more graphics control vector values to a user; and
program instructions to receive an update, from the user, to at least one of the one or more graphics control vector values.

15. A computer system for recognizing a face in a first facial image, the computer system comprising:
one or more computer processors;
one or more computer readable storage medium;
program instructions stored on the computer readable storage medium for execution by at least one of the one or more processors, the program instructions comprising:
program instructions to generate a set of facial appearance parameters that are derived from a first facial image;
program instructions to generate a graphics control vector based, at least in part, on the set of facial appearance parameters;
program instructions to generate a local inverse model of a graphics rendering process by building an image Jacobian matrix with respect to elements of the graphics control vector, the local inverse model being used to generate the adjusted vector;
program instructions to render a second facial image based on the graphics control vector;
program instructions to compare the second facial image to the first facial image;
program instructions to generate an adjusted vector by adjusting one or more parameters of the graphics control vector such that a degree of similarity between the second facial image and the first facial image is increased, wherein the adjusted vector includes a biometric portion; and
program instructions to generate a first face representation based, at least in part, on the biometric portion of the adjusted vector.

16. The computer system of claim 15, the program instructions further comprising:
program instructions to iteratively repeat a process comprising:
rendering, by one or more processors, a third facial image that is generated using an updated version of the adjusted vector; and
comparing, by one or more processors, the third facial image to the first facial image, wherein one or more parameters of the adjusted vector are updated until a degree of difference between the first facial image and the third facial image is below a threshold at which point repetition ends.

17. The computer system of claim 15, the program instructions further comprising:
program instructions to perform facial recognition based, at least in part, on the first face representation, wherein the first face representation is compared to at least one second face representation.

18. The computer system of claim 15, wherein program instructions to generate the set of facial appearance parameters that are derived from a first facial image comprise:
program instructions to determine a plurality of estimates for one or more facial appearance parameters of the first facial image;
program instructions to utilize at least one conflict resolution approach when two or more estimates of the plurality of estimates are determined for a given facial appearance parameter of the first facial image; and
program instructions to generate the set of facial appearance parameters based, at least in part, on a facial appearance parameter that was determined, in part, using the at least one conflict resolution approach.

19. The computer system of claim 15, the program instructions further comprising:
program instructions to generate a fixed-length vector as the first face representation by extracting the biometric portion of the adjusted vector; and
comparing the first face representation fixed-length vector to the at least one second face representation fixed-length vector using an approximate nearest neighbor match.

20. The computer system of claim 15, wherein generating an adjusted vector comprises:
program instructions to present one or more graphics control vector values to a user; and
program instructions to receive an update, from the user, to at least one of the one or more graphics control vector values.

* * * * *